United States Patent
Ham et al.

(10) Patent No.: US 9,977,177 B2
(45) Date of Patent: May 22, 2018

(54) BACKLIGHT UNIT, DISPLAY DEVICE AND METHOD OF MANUFACTURING COMPRISING A REFLECTIVE PLATE WITH MAGNETIC LAYER ATTACHING THE REFLECTIVE PLATE TO A BOTTOM PORTION OF A CHASSIS

(71) Applicant: Samsung Display Co., Ltd., Yongin-Si, Gyeonggi-Do (KR)

(72) Inventors: Munsik Ham, Cheonan-si (KR); Kyoungduck Kim, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 154 days.

(21) Appl. No.: 15/220,520

(22) Filed: Jul. 27, 2016

(65) Prior Publication Data
US 2017/0192160 A1 Jul. 6, 2017

(30) Foreign Application Priority Data
Jan. 6, 2016 (KR) .......................... 10-2016-0001658

(51) Int. Cl.
*F21V 8/00* (2006.01)
(52) U.S. Cl.
CPC ......... *G02B 6/0088* (2013.01); *G02B 6/0055* (2013.01); *G02B 6/0065* (2013.01)
(58) Field of Classification Search
CPC .............................. G02B 6/0088; G02B 6/0055
See application file for complete search history.

(56) References Cited

U.S. PATENT DOCUMENTS

| | | | | |
|---|---|---|---|---|
| 7,894,015 B2* | 2/2011 | Kawase | ............ | G02F 1/133605 349/112 |
| 8,988,633 B2* | 3/2015 | Li | ......................... | G02B 6/0091 349/58 |
| 2009/0180247 A1 | 7/2009 | Park et al. | | |
| 2010/0296023 A1 | 11/2010 | Jiang | | |

FOREIGN PATENT DOCUMENTS

| | | |
|---|---|---|
| KR | 1020050091431 A | 9/2005 |
| KR | 1020060038258 A | 5/2006 |
| KR | 1020070057332 A | 6/2007 |
| KR | 1020090024964 A | 3/2009 |
| KR | 1020090077416 A | 7/2009 |
| WO | WO 2013002117 A1 * | 1/2013 ........... G02B 6/0088 |

* cited by examiner

*Primary Examiner* — Robert May
(74) *Attorney, Agent, or Firm* — Cantor Colburn LLP (57) ABSTRACT

A backlight unit includes a bottom chassis including a bottom portion and a sidewall portion which extends from the bottom portion; a light source disposed in the bottom chassis and configured to generate and emit a light to a display panel which displays an image with the light; and a reflective plate disposed on the bottom portion of the bottom chassis and configured to reflect a portion of the light emitted by the light source toward the display panel The reflective plate includes a reflective layer configured to reflect the light incident thereto; and a magnetic layer disposed between the reflective layer and the bottom portion of the bottom chassis, and magnetically attached to the bottom portion of the bottom chassis.

20 Claims, 5 Drawing Sheets

BACKLIGHT UNIT, DISPLAY DEVICE AND METHOD OF MANUFACTURING COMPRISING A REFLECTIVE PLATE WITH MAGNETIC LAYER ATTACHING THE REFLECTIVE PLATE TO A BOTTOM PORTION OF A CHASSIS

This application claims priority to Korean Patent Application No. 10-2016-0001658, filed on Jan. 6, 2016, and all the benefits accruing therefrom under 35 U.S.C. § 119, the content of which in its entirety is herein incorporated by reference.

BACKGROUND

1. Field

The invention relates to a backlight unit, a display device including the same, and a method of manufacturing the same. More particularly, the invention relates to a backlight unit which improves a coupling force between a bottom chassis and a reflective plate of a display device, a display device including the backlight unit, and a method of manufacturing the backlight unit.

2. Description of the Related Art

As flat display devices, various display devices, such as a liquid crystal display device, a plasma display panel, a field emission display device, a light emitting diode display device, an organic light emitting display device, etc., have been developed.

Among the flat display devices, the liquid crystal display device is widely applied to various fields since the liquid crystal display device has advantages of relatively low power consumption, thin thickness, high-definition display quality, wide screen, etc.

Since the liquid crystal display device is not light self-emissive, the liquid crystal display device employs a light source. Accordingly, the liquid crystal display device includes a backlight unit generating a light. The liquid crystal display device includes a bottom chassis to accommodate therein the backlight unit, and thus the backlight unit is protected from external impacts. The backlight unit includes a reflective plate to reflect a light and is disposed on a bottom portion of the bottom chassis.

SUMMARY

One or more exemplary embodiment of the invention provides a backlight unit, a display device including the same, and a method of manufacturing the same, each of which is capable of improving a coupling force between a bottom chassis and a reflective plate of the backlight unit.

Embodiments of the invention provide a backlight unit including a light source configured to generate and emit a light to a display panel which displays an image with the light, a bottom chassis, and a reflective plate.

The bottom chassis includes a bottom portion and a sidewall portion extending from the bottom portion. The light source is disposed in the bottom chassis. The reflective plate is disposed on the bottom portion and configured to reflect a portion of the light emitted by the light source toward the display panel.

The reflective plate includes a reflective layer and a magnetic layer.

The reflective layer reflects the light incident thereto.

The magnetic layer is disposed between the reflective layer and the bottom portion and magnetically attached to the bottom portion. The magnetic layer overlaps the bottom portion and is a single plate.

The reflective plate further includes an adhesive layer between the reflective layer and the magnetic layer to attach the reflective layer and the magnetic layer to each other.

The reflective plate further includes a protective layer opposing the magnetic layer with respect to the reflective layer.

The bottom chassis includes a ferromagnetic material. The bottom chassis includes iron.

The backlight unit further includes a light guide plate disposed to face the bottom portion such that the reflective plate is disposed between the light guide plate and the bottom portion. The light emitted from the light source is incident to the light guide plate and the light guide plate is configured to guide the light incident thereto to the display panel.

The light source overlaps the reflective plate.

Embodiments of the invention provide a method of manufacturing a display device, including forming a reflective plate which is configured to reflect light incident thereto to a display panel of the display device which displays an image with the light, by attaching a magnetic layer of the reflective plate to a surface of a reflective layer of the reflective plate; and attaching the magnetic layer of the formed reflective plate to a bottom chassis of the display device to magnetically couple the reflective plate and the bottom chassis to each other.

The forming the reflective plate includes laminating the reflective layer thereof to a magnetic sheet of the reflective plate, by using an adhesive layer therebetween and forming a protective layer opposing the magnetic sheet with respect to the reflective layer, such that the reflective layer is disposed between the protective layer and the magnetic sheet.

The forming the reflective plate includes coating a magnetic material to form a magnetic material layer of the reflective plate on the reflective layer thereof; and forming a protective layer opposing the magnetic material layer, such that the reflective layer is disposed between the protective layer and the magnetic material layer.

The method further includes disposing a light source which generates and emits the light, in the bottom chassis; and disposing a light guide plate configured to guide the light emitted from the light source and incident thereto to the display panel, on the reflective plate which is magnetically coupled to the bottom chassis.

The method further includes disposing a light source which generates and emits the light, in the bottom chassis to overlap the reflective plate which is magnetically coupled to the bottom chassis.

According to one or more exemplary embodiment according to the invention, the reflective plate and the bottom chassis are magnetically coupled to each other by the magnetic force. Therefore, a time required to couple the reflective plate and the bottom chassis to each other is reduced, and the reflective plate and bottom chassis may be easily detached and reattached to each other when the reflective plate is mis-coupled to the bottom chassis.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein, The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1:
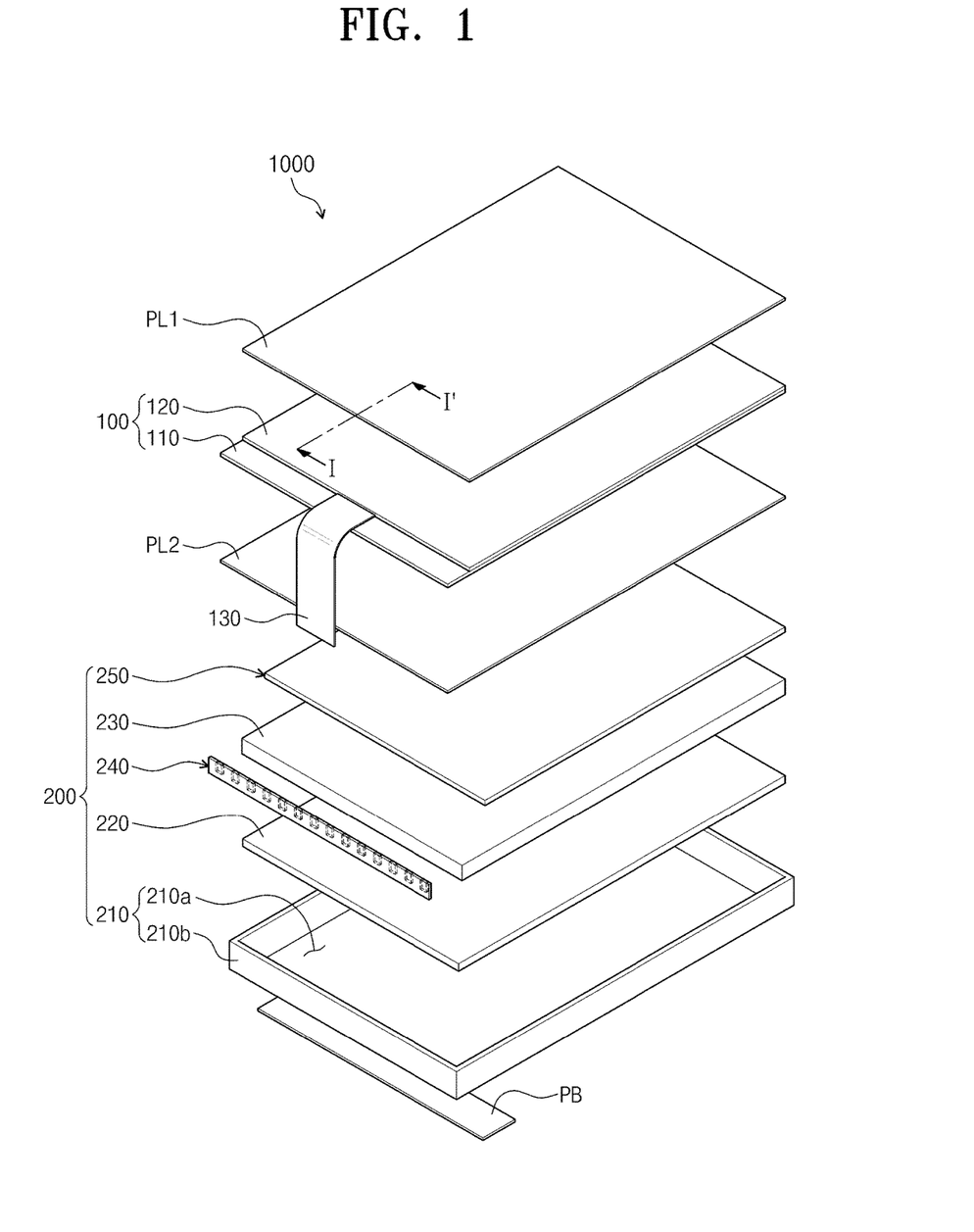
FIG. 1 is an exploded perspective view showing an exemplary embodiment of a display device according to the invention.
Figure 2:
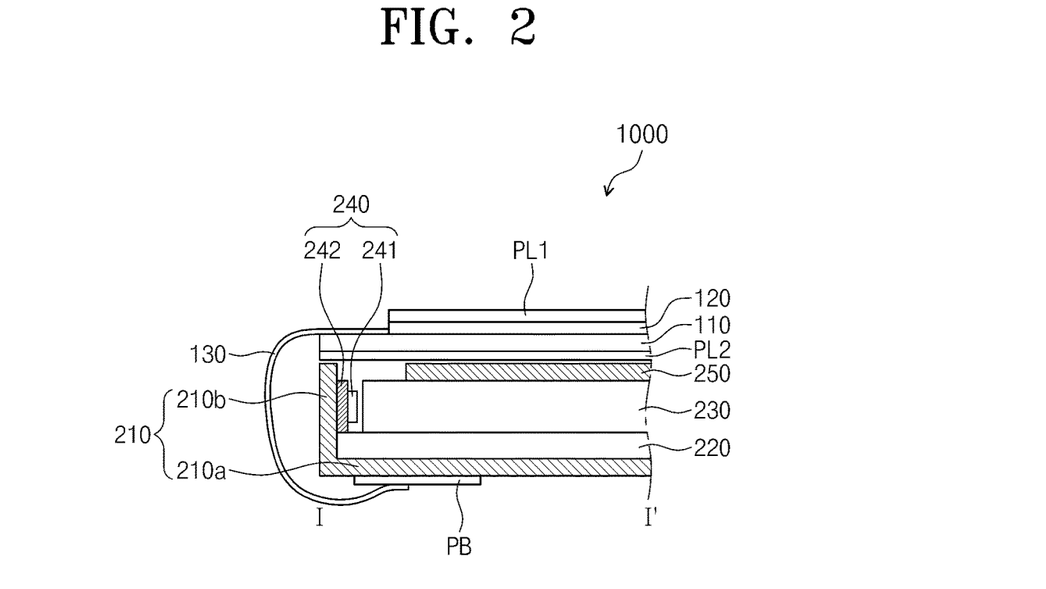
FIG. 2 is a cross-sectional view of the display device taken along line I-I' of FIG. 1.

FIG. 1 is an exploded perspective view showing an exemplary embodiment of a display device 1000 according to the invention, and FIG. 2 is a cross-sectional view of the display device taken along line I-I' of FIG. 1.

Referring to FIGS. 1 and 2, the display device 1000 includes a display panel 100 and a backlight unit 200.

The display panel 100 is configured to display an image in a viewing direction of the display device 1000 (e.g., an upper direction in FIG. 1). The display panel 100 may be, but not limited to, a display panel, which is configured to display the image using an ambient light since the display panel 100 is not self-emissive with respect to light, other than a self-emissive display panel, e.g., an organic light emitting display panel. In an exemplary embodiment, for instance, the display panel 100 may be, but not limited to, one of a liquid crystal display panel, an electrophoretic display panel and an electrowetting display panel. Hereinafter, the liquid crystal display panel will be described as the display panel 100.

The display panel 100 includes a first display substrate 110, a second display substrate 120 facing the first display substrate 110, and a liquid crystal layer (not shown) interposed between the first and second display substrates 110 and 120.

The first display substrate 110 includes gate lines, data lines, thin film transistors and pixel electrodes, for which each may be disposed on a first base substrate within the first display substrate 110. The gate lines are insulated from the data lines while crossing the data lines. Each thin film transistor may be a three-terminal device and connected to one gate line of the gate lines, one data line of the data lines, and one pixel electrode of the pixel electrodes. When the thin film transistor is turned on in response to a signal applied to the gate line, a data voltage applied to the data line is applied to the pixel electrode.

The second display substrate 120 is disposed on the first display substrate 110. The second display substrate 120 is disposed to face the first display substrate 110 such that a liquid crystal layer (not shown) is disposed between the first and second display substrates 110 and 120. The second display substrate 120 includes a color filter and a common electrode, for which each may be disposed on a second base substrate within the second display substrate 120. In an exemplary embodiment, the color filter and the common electrode may be included in the first display substrate 110.

The second display substrate 120 has an overall planar size smaller than that of the first display substrate 110 when viewed in a top plan view. Accordingly, a portion of the first display substrate 110 extends further than the second display substrate 120 and is exposed without being covered by the second display substrate 120.

The liquid crystal layer includes a plurality of liquid crystal molecules for which an alignment thereof is changed depending on an electric field disposed between the first display substrate 110 and the second display substrate 120.

The display device 1000 further includes a driving circuit film 130 and a printed circuit board PB.

In an assembled state of the display device 1000, the driving circuit film 130 is bent from the display panel 100 to electrically connect the display panel 100 and the printed circuit board PB to each other. In detail, a first end of the driving circuit film 130 is connected to a surface of the first display substrate 110 which is not covered by the second display substrate 120, and a second end of the driving circuit film 130 opposing the first end thereof is connected to the printed circuit board PB.

The printed circuit board PB is disposed under the backlight unit 200. The printed circuit board PB applies a signal to and/or receives a signal from the display panel 100 through the driving circuit film 130.

The display device 1000 may further include a pair of polarizing plates PL1 and PL2 respectively disposed on upper and lower surfaces of the display panel 100.

The backlight unit 200 is disposed under the display panel 100 to provide a light to the display panel 100.

The backlight unit 200 includes a bottom chassis 210, a reflective plate 220, a light guide plate 230, a light source unit 240 and optical sheets 250.

The bottom chassis 210 includes or defines a bottom portion 210a and a sidewall 210b which protrudes extending from an edge of the bottom portion 210a. The bottom portion may otherwise be referred to as a bottom surface 210a. The bottom chassis 210 includes an accommodating space defined by the bottom surface 210a and the sidewall 210b, and the reflective plate 220, the light guide plate 230, the light source unit 240 and the optical sheets 250 are accommodated in the accommodating space.

The reflective plate 220 is disposed on the bottom chassis 210. The reflective plate 220 reflects the light incident thereto to the light guide plate 230. The reflective plate 220 will be described in detail later.

The light guide plate 230 is disposed in the accommodating space. The light guide plate 230 is disposed to face the bottom surface 210a such that the reflective plate 220 is disposed between the light guide plate 230 and the bottom surface 210a. The light guide plate 230 includes an incident surface and an exit surface. The light generated and provided from a light source 241 is incident to the light guide plate 230 through a light incident surface thereof, and the incident light is guided by and within the light guide plate 230 and exits through a light exit surface thereof to travel to the display panel 100. The light guide plate 230 includes or defines the light exit surface facing the display panel 100, a rear surface which opposes the light exit surface, and side surfaces which connect the light exit surface and the rear surface to each other. The light incident surface of the light guide plate 230 may be a side surface among the side surfaces which connect the light exit surface and the rear surface to each other.

The light source unit 240 includes the light source 241 and a light source printed circuit board 242. The light source 241 is provided in a plural number, mounted on the light source printed circuit board 242, and generates and emits the light in response to a source voltage. The light source 241 may be, but not limited to, a light emitting diode ("LED") which generates and emits light. The light source printed circuit board 242 receives the source voltage from outside there of to drive the light source 241 to generate and emit the light.

In the illustrated exemplary embodiment, the light source 241 is the light emitting diode, but the light source 241 may be any of a number of light-generating and emitting sources such as a cold cathode fluorescent lamp ("CCFL") or a flat fluorescent lamp ("FFL").

The optical sheets 250 are disposed on the light guide plate 230 to improve an efficiency of the light exiting from the light guide plate 230. The optical sheets 250 collectively include plural individual sheets such as a diffusion sheet, a condensing sheet and a protective sheet. The diffusion sheet diffuses the light incident thereto. The condensing sheet enhances a brightness of the light diffused by the diffusion sheet. The protective sheet protects the condensing sheet and secures a viewing angle.

Figure 3:
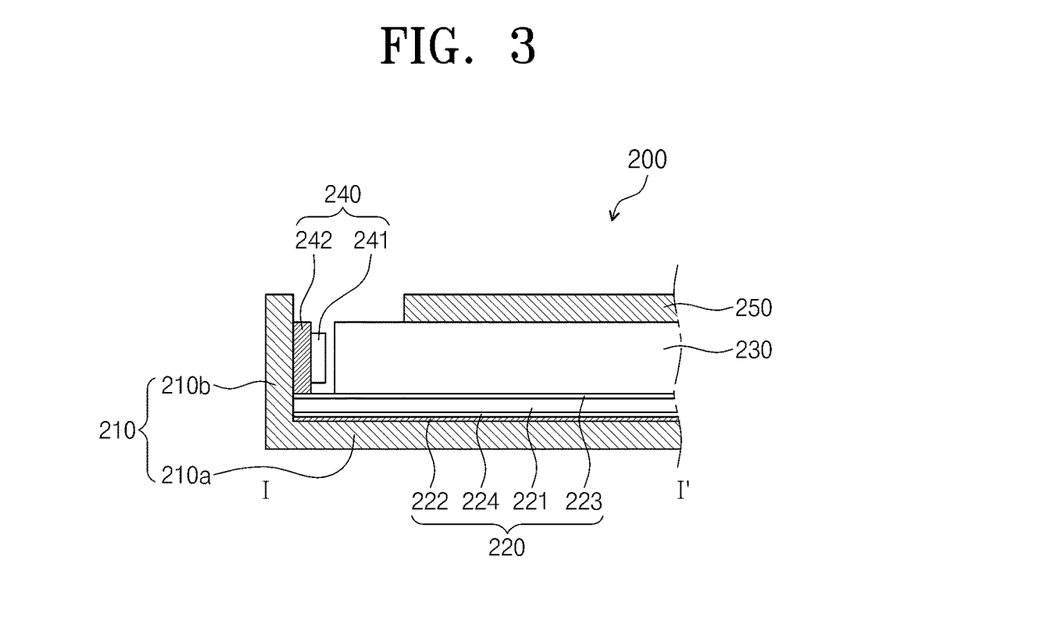
FIG. 3 is a cross-sectional view of an exemplary embodiment of backlight unit of a display device taken along a line I-I' of FIG. 1.
Figure 4:
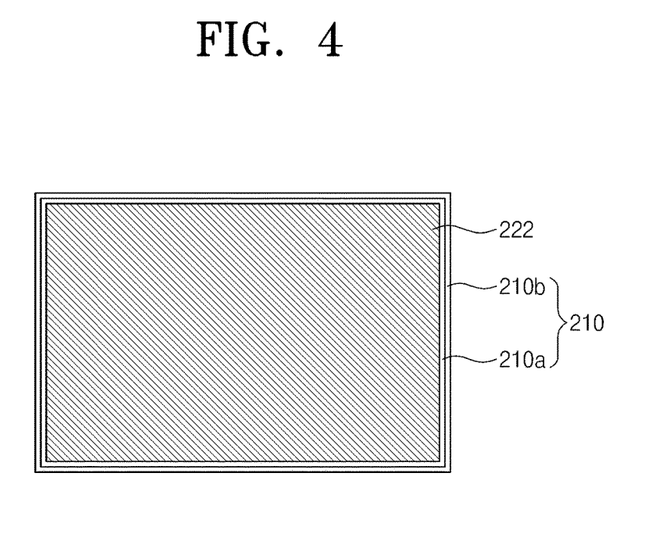
FIG. 4 is a top plan view showing an exemplary embodiment of a bottom chassis and a magnetic member according to the invention.

FIG. 3 is a cross-sectional view of the backlight unit 200 of the display device 1000 taken along line I-I' of FIG. 1, and FIG. 4 is a top plan view showing an exemplary embodiment of the bottom chassis 210 and a magnetic member 222 relative to each other according to the invention.

Referring to FIG. 3, the reflective plate 220 is disposed on the bottom surface 210a of the bottom chassis 210. In detail, the reflective plate 220 is disposed between the bottom surface 210a of the bottom chassis 210 and the light guide plate 230. The reflective plate 220 includes or defines a reflective member 221, the magnetic member 222, a protective member 223 and an adhesive member 224. The aforementioned members may otherwise be respectively referred to as a reflective layer (or sheet) 221, the magnetic layer (or sheet) 222, a protective layer (or sheet) 223 or an adhesive layer (or sheet) 224.

The reflective member 221 is disposed between the bottom surface 210a and the light guide plate 230. The reflective member 221 reflects the light leaked downward from the light guide plate 230 such that the leaked light is re-incident to the light guide plate 230. Although not shown in figures, the reflective member 221 includes or defines a base layer and a reflective material which is disposed on a surface of the base layer. The base layer includes a poly (ethylene terephthalate) ("PET") film. The reflective material has a relatively high reflectance and includes, but is not limited to, silver, aluminum, or titanium dioxide (TiO2).

The magnetic member 222 is disposed between the reflective member 221 and the bottom surface 210a. The magnetic member 222 couples the bottom chassis 210 and the reflective plate 220 (or remaining layers thereof) to each other. The magnetic member 222 has substantially the same planar area as that of the reflective member 221 and is coupled to a lower surface of the reflective member 221. The magnetic member 222 includes a material having magnetism, e.g., magnetite.

The bottom chassis 210 may include a material which is attracted to that of the magnetic member 222 such as a ferromagnetic substance to enhance a coupling force between the magnetic member 222 and the bottom chassis 210. The bottom chassis 210 includes iron, but should not be limited thereto or thereby. That is, the bottom chassis 210 may include any of a number of materials which is magnetically attracted to that of the magnetic member 222, such as cobalt, nickel and an alloy thereof.

The bottom chassis 210 including the ferromagnetic substance is magnetized by the magnetic member 222. Accordingly, a magnetic attraction force occurs between the magnetic member 222 and the bottom chassis 210, and the bottom chassis 210 is coupled to the reflective plate 220.

Referring to FIG. 4, the magnetic member 222 is overlapped with the bottom surface 210a of the bottom chassis 210. As shown in FIG. 4, the magnetic member 222 has a total planar area smaller than that of the bottom surface 210a when viewed in the top plan view, to expose a portion of the bottom surface 210a, but the invention is not limited thereto. In exemplary embodiments, a side surface of the magnetic member 222 may make contact with the sidewall 210b of the bottom chassis 210 such as to cover an entirety of the bottom surface 210a of the bottom chassis 210.

The magnetic member 222 may be provided in the form a single plate. Where the magnetic member 222 is provided as the single plate, a constant coupling force occurs between the reflective plate 220 and the bottom surface 210a of the bottom chassis 210, which are overlapped with each other. In addition, since the magnetic member 222 is provided in the form of the single plate, a planar area, in which the reflective member 222 is not coupled to the bottom surface 210a, may be minimized.

Where the reflective plate 220 is coupled to the bottom chassis 210 by the magnetic member 222, the reflective plate 220 and the bottom chassis 210 are easily attached to and detached from each other, that is, removable disposed with each other. Therefore, although the reflective plate 220 is bent while being coupled to the bottom chassis 210, a user may reattach the reflective plate 220 to the bottom chassis 210 after detaching the reflective plate 220 from the bottom chassis 210.

The reflective plate 220 may further include the adhesive member 224 to attach the magnetic member 222 to the reflective member 221. The adhesive member 224 may include an acrylic resin, but should not be limited thereto or thereby.

The protective layer 223 is disposed opposing the magnetic member 222 with respect to other layers of the reflective plate 220, such that the reflective member 221 is disposed between the protective layer 223 and the magnetic member 222. In a conventional backlight unit, where a light guide plate makes contact with a reflective member or plate disposed in a bottom chassis, the reflective member may be easily damaged, and the light reflectance of the reflective member may be undesirably reduced. However, in one or more exemplary embodiment of the invention, to prevent the reflective member 221 from being damaged from contact with the light guide plate 230, the protective layer 223 may be disposed between the light guide plate 230 and the reflective member 221.

Figure 5:
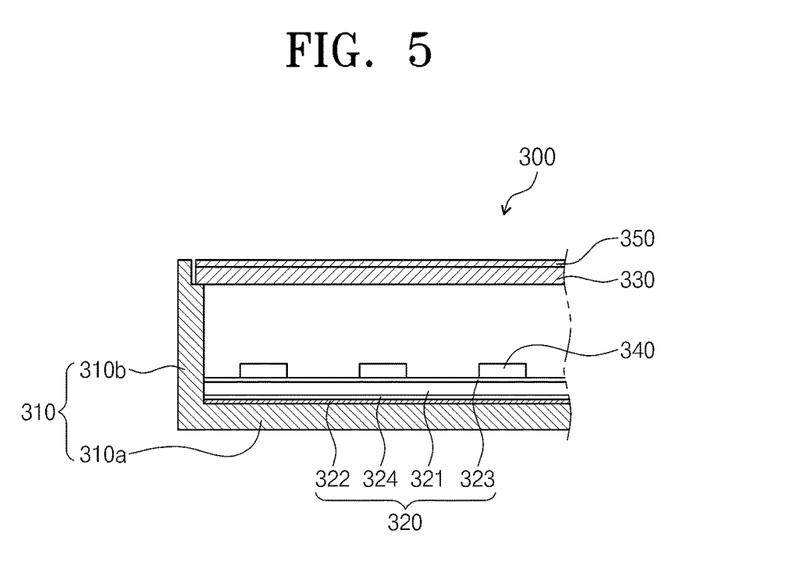
FIG. 5 is a cross-sectional view showing another exemplary embodiment of a backlight unit of a display device according to the invention.

FIG. 5 is a cross-sectional view showing another exemplary embodiment of a backlight unit 300 according to the invention.

Referring to FIG. 5, the backlight unit 300 includes a bottom chassis 310, a reflective plate 320, a diffusion plate 330, a light source 340 provided in plural and optical sheets 350.

The bottom chassis 310 includes or defines a bottom portion 310a and a sidewall 310b which protrudes extending from an edge of the bottom portion 310a. The bottom portion may otherwise be referred to as a bottom surface 310a. The bottom chassis 310 includes an accommodating space defined by the bottom surface 310a and the sidewall 310b.

The light sources 340 are disposed on the reflective plate 320. In more detail, the light sources 340 are disposed on the reflective plate 320 to overlap with the reflective plate 320 in a top plan view thereof. The light sources 340 are disposed under the diffusion plate 330 and the optical sheets 350 in a cross-sectional thickness direction of the backlight unit 300, e.g., a direct-illumination structure, and thus a light generated and emitted from the light sources 340 is directly incident to the diffusion plate 330 without passing through a light guide plate (230 in FIG. 3) such that the light guide plate is omitted.

The diffusion plate 330 is disposed on the bottom chassis 310. The diffusion plate 330 may be supported on the bottom chassis 310 at a portion of the sidewall 310b. Different from the structure shown in FIG. 5, in an exemplary embodiment, the diffusion plate 330 may be accommodated in the bottom chassis 310 instead of being disposed thereon. As being accommodated in the bottom chassis 310, the diffusion plate 330 may be disposed between innermost surfaces of the sidewall 310b. The diffusion plate 330 uniformly diffuses the light emitted from the light sources 340. That is, the diffusion plate 330 diffuses the light provided from the light sources 340 to reduce or effectively prevent the light from being locally concentrated. Although not shown in figures, a pressure-sensitive layer may be disposed between the diffusion plate 330 and the bottom chassis 310.

Figure 6:
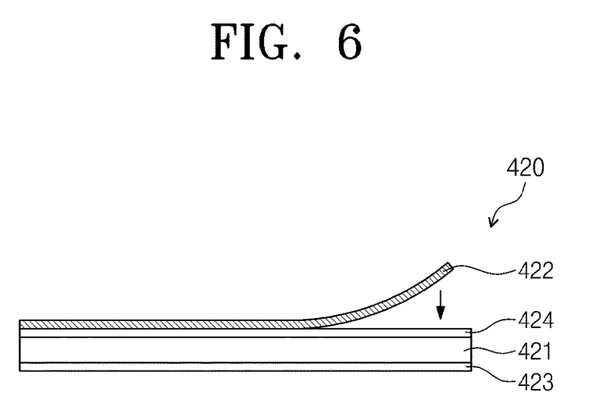
FIG. 6 is a cross-sectional view showing an exemplary embodiment of a process of forming a reflective plate according to the invention.
Figure 7:
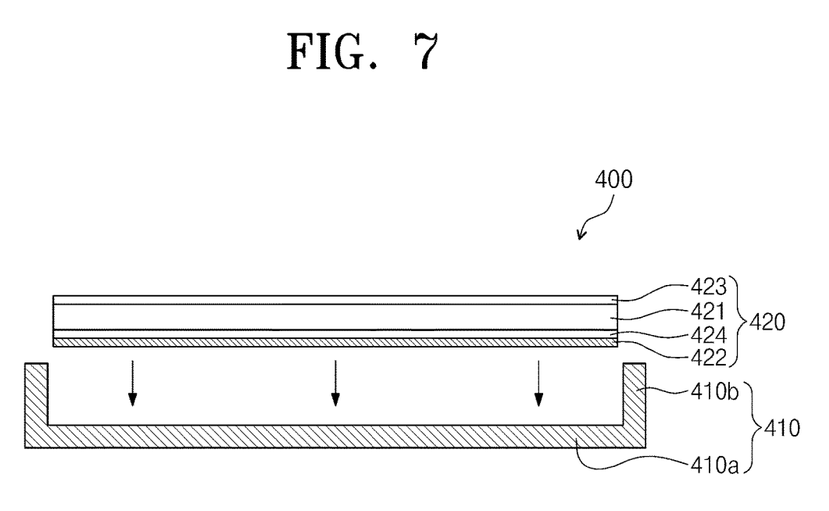
FIG. 7 is a cross-sectional view showing an exemplary embodiment of a process of coupling a reflective plate and a bottom chassis to each other according to the invention.

FIG. 6 is a cross-sectional view showing an exemplary embodiment of a process of forming a reflective plate 420 according to the invention, and FIG. 7 is a cross-sectional view showing an exemplary embodiment of a process of coupling the reflective plate 420 and a bottom chassis 410 to each other according to the invention.

A backlight unit 400 includes the bottom chassis 410, the reflective plate 420 and a light source unit. In FIG. 5, for convenience of explanation, the bottom chassis 410 and the reflective plate 420 are illustrated and other components of the backlight unit 400 describe above are omitted.

The bottom chassis 410 includes or defines a bottom portion 410a and a sidewall 410b which protrudes extending from an edge of the bottom portion 410a. The bottom portion may otherwise be referred to as a bottom surface 410a. The bottom chassis 410 includes an accommodating space defined by the bottom surface 410a and the sidewall 410b.

The manufacturing method of a backlight unit 400 includes forming a reflective plate 420 by attaching a magnetic member 422 on a surface of a stack of layers of the reflective plate 420, attaching the magnetic member 422 to a bottom chassis 410 to couple the reflective plate 420 and the bottom chassis 410 to each other, and disposing a light source (refer to 240 in FIG. 3 or 340 in FIG. 5) on the reflective plate 420 which is coupled to the bottom chassis 410.

Referring to FIG. 6, the forming the reflective plate 420 includes laminating a reflective member 421 and the magnetic member 422 to each other using an adhesive member 424 therebetween and forming a protective member 423 opposing the magnetic member 422 with respect to remaining layers of the reflective plate 420 such that the reflective member 421 is disposed between the magnetic member 422 and the protective member 423.

The magnetic member 422 has a sheet shape. The adhesive member 424 is disposed or formed on the reflective member 421, and the magnetic member 422 is pressurized onto the adhesive member 424. The reflective member 421 and the magnetic member 422 are formed to be a single unitary and individual unit through the lamination process described above.

The forming the protective layer 423 may be substantially simultaneously performed with the lamination process. The protective layer 423, the magnetic member 422 and the reflective member 421 may be substantially simultaneously laminated to respective layers of the reflective plate 420.

Referring to FIG. 7, the formed reflective plate 420 is coupled to the bottom chassis 410 by a magnetic force between the magnetic member 422 of the reflective plate 420 and the bottom surface 410a of the bottom chassis 410.

Although not shown in figures, the manufacturing method of the backlight unit 400 further includes disposing a light source (refer to 240 in FIG. 3 or 340 in FIG. 5) on the reflective plate 420. The light source may be disposed on the reflective plate 420 to overlap with the reflective plate 420.

In an exemplary embodiment, referring to the backlight unit 300 in FIG. 5, the manufacturing method of the backlight unit 400 may further include forming a diffusion plate (refer to 330 in FIG. 5) on the bottom chassis 410 and forming optical sheets (refer to 350 in FIG. 5) on the diffusion plate.

In an exemplary embodiment, referring to the backlight unit 200 in FIG. 3, the manufacturing method of the backlight unit 400 may further include forming a light guide plate (refer to 230 in FIG. 3) on the reflective plate 420 and forming the optical sheets (refer to 250 in FIG. 3) on the light guide plate.

Figure 8:
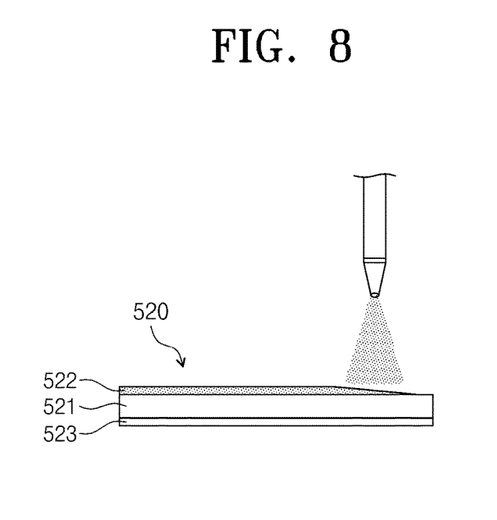
FIG. 8 is a cross-sectional view showing another exemplary embodiment of a process of forming a reflective plate according to the invention.
Figure 9:
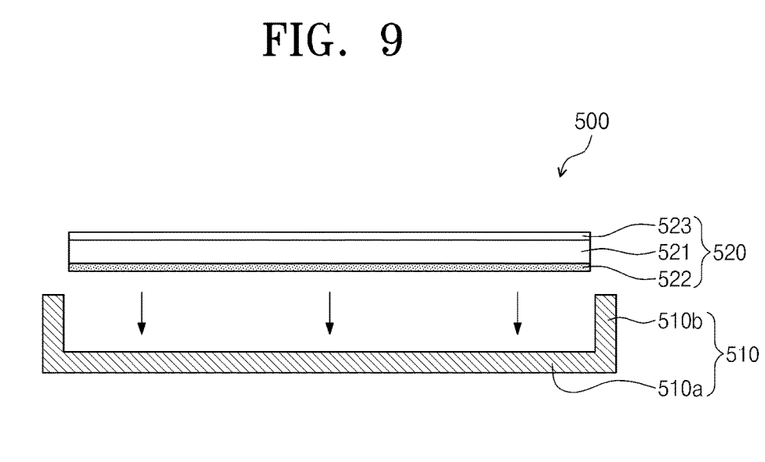
FIG. 9 is a cross-sectional view showing another exemplary embodiment of a process of coupling a reflective plate and a bottom chassis to each other according to the invention.

FIG. 8 is a cross-sectional view showing another exemplary embodiment of a process of forming a reflective plate 520 according to the invention, and FIG. 9 is a cross-sectional view showing an exemplary embodiment of a process of coupling the reflective plate 520 and a bottom chassis 510 to each other according to the invention.

A backlight unit includes the bottom chassis 510, the reflective plate 520 and a light source unit. In FIG. 9, for convenience of explanation, the bottom chassis 510 and the reflective plate 520 are illustrated and other components of the backlight unit describe above are omitted.

The bottom chassis 510 includes or defines a bottom portion 510a and a sidewall 510b which protrudes extending from an edge of the bottom portion 510a. The bottom portion may otherwise be referred to as a bottom surface 510a. The bottom chassis 510 includes an accommodating space defined by the bottom surface 510a and the sidewall 510b.

Referring to FIG. 8, the forming the reflective plate 520 includes coating a magnetic member 522 on a reflective member 521, and forming a protective layer 523 opposing the magnetic member 522 with respect to the reflective member 521, such that the reflective member 521 is disposed between the protective layer 523 and the magnetic member 522.

In an exemplary embodiment, the magnetic member 522 may be formed using a magnetic paint provided in powder form. The magnetic paint in powder form is coated on the reflective member 521 such as through a spray unit. Where the magnetic paint is coated on the reflective member 521, a separate adhesive member (refer to 424 in FIG. 6) may be omitted. The reflective member 521 and the magnetic member 522 are formed to be a single unitary and individual unit through the coating process described above.

Referring to FIG. 9, the formed reflective plate 520 and the bottom chassis 510 are coupled to each other by a magnetic force between the magnetic member 522 of the reflective plate 520 and the bottom surface 510a of the bottom chassis 510.

The manufacturing method of the backlight unit in FIG. 9 may similarly include disposing a light source, a diffusion plate, optical sheets and/or a light guide plate as described above for the backlight unit 400 in FIG. 7.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A backlight unit comprising:
  a bottom chassis comprising a bottom portion and a sidewall portion which extends from the bottom portion;
  a light source disposed in the bottom chassis and configured to generate and emit a light to a display panel which displays an image with the light; and
  a reflective plate disposed on the bottom portion of the bottom chassis and configured to reflect a portion of the light emitted by the light source toward the display panel, the reflective plate comprising:
    a reflective layer configured to reflect the light incident thereto; and
    a magnetic layer disposed between the reflective layer and the bottom portion of the bottom chassis, and magnetically attached to the bottom portion of the bottom chassis.

2. The backlight unit of claim 1, wherein the bottom chassis comprises a ferromagnetic material.

3. The backlight unit of claim 1, further comprising a light guide plate disposed to face the bottom portion of the bottom chassis such that the reflective plate is disposed between the light guide plate and the bottom portion,
  wherein the light emitted from the light source is incident to the light guide plate and the light guide plate is configured to guide the light incident thereto to the display panel.

4. The backlight unit of claim 1, wherein the light source disposed in the bottom chassis overlaps the reflective plate disposed on the bottom portion of the bottom chassis.

5. The backlight unit of claim 1, wherein the reflective plate further comprises an adhesive layer which is between the reflective layer and the magnetic layer to attach the reflective layer and the magnetic layer to each other.

6. The backlight unit of claim 1, wherein the reflective plate further comprises a protective layer disposed opposing the magnetic layer with respect to the reflective layer.

7. The backlight unit of claim 1, wherein the magnetic layer overlaps the bottom portion of the bottom chassis and is a single plate.

8. A display device comprising:
a display panel configured to display an image with light; and
a backlight unit configured to provide the light to the display panel, the backlight unit comprising:
a bottom chassis comprising a bottom portion and a sidewall portion which extends from the bottom portion;
a light source disposed in the bottom chassis and configured to generate and emit the light; and
a reflective plate disposed on the bottom portion of the bottom chassis and configured to reflect a portion of the light emitted by the light source toward the display panel, the reflective plate comprising:
a reflective layer configured to reflect the light incident thereto; and
a magnetic layer disposed between the reflective layer and the bottom portion of the bottom chassis, and magnetically attached to the bottom portion of the bottom chassis.

9. The display device of claim 8, wherein the bottom chassis comprises a ferromagnetic material.

10. The display device of claim 8, further comprising a light guide plate disposed to face the bottom portion of the bottom chassis such that the reflective plate is disposed between the light guide plate and the bottom portion, wherein the light emitted from the light source is incident to the light guide plate and the light guide plate is configured to guide the light incident thereto to the display panel.

11. The display device of claim 8, wherein the light source disposed in the bottom chassis overlaps the reflective plate disposed on the bottom portion of the bottom chassis.

12. The display device of claim 8, wherein the reflective plate further comprises an adhesive layer which is between the reflective layer and the magnetic layer to attach the reflective layer and the magnetic layer to each other.

13. The display device unit of claim 8, wherein the reflective plate disposed on the bottom portion of the bottom chassis further comprises a protective layer disposed between the reflective layer and the light guide plate.

14. The display device of claim 8, wherein the magnetic layer overlaps the bottom portion of the bottom chassis and is a single plate.

15. A method of manufacturing a display device, comprising:
forming a reflective plate which is configured to reflect light incident thereto to a display panel of the display device which displays an image with the light, by attaching a magnetic layer of the reflective plate to a surface of a reflective layer of the reflective plate; and
attaching the magnetic layer of the formed reflective plate to a bottom chassis of the display device to magnetically couple the reflective plate and the bottom chassis to each other.

16. The method of claim 15, wherein the forming the reflective plate comprises:
laminating the reflective layer thereof to a magnetic sheet of the reflective plate, by using an adhesive layer therebetween; and
forming a protective layer opposing the magnetic sheet with respect to the reflective layer, such that the reflective layer is disposed between the protective layer and the magnetic sheet.

17. The method of claim 15, wherein the forming the reflective plate comprises:
coating a magnetic material to form a magnetic material layer of the reflective plate on the reflective layer thereof; and
forming a protective layer opposing the magnetic material layer, such that the reflective layer is disposed between the protective layer and the magnetic material layer.

18. The method of claim 15, further comprising:
disposing a light source which generates and emits the light, in the bottom chassis; and
disposing a light guide plate configured to guide the light emitted from the light source and incident thereto to the display panel, on the reflective plate which is magnetically coupled to the bottom chassis.

19. The method of claim 15, further comprising disposing a light source which generates and emits the light, in the bottom chassis to overlap the reflective plate which is magnetically coupled to the bottom chassis.

20. The method of claim 15, wherein the bottom chassis comprises a ferromagnetic material.

* * * * *